(12) United States Patent
Kinoshita

(10) Patent No.: US 12,198,446 B2
(45) Date of Patent: Jan. 14, 2025

(54) ROAD SURFACE STATE DETECTION APPARATUS AND ROAD SURFACE STATE NOTIFICATION APPARATUS

(71) Applicant: SUBARU CORPORATION, Tokyo (JP)

(72) Inventor: Yuta Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 241 days.

(21) Appl. No.: 17/882,767

(22) Filed: Aug. 8, 2022

(65) Prior Publication Data

US 2023/0068705 A1   Mar. 2, 2023

(30) Foreign Application Priority Data

Aug. 24, 2021 (JP) ................................. 2021-136316

(51) Int. Cl.
| | |
|---|---|
| *G06V 20/56* | (2022.01) |
| *B60Q 1/24* | (2006.01) |
| *B60Q 9/00* | (2006.01) |
| *F21W 103/60* | (2018.01) |
| *G06V 10/141* | (2022.01) |
| *H04N 23/20* | (2023.01) |
| *H04N 23/56* | (2023.01) |
| *H04N 23/74* | (2023.01) |
| *F21W 105/00* | (2018.01) |

(52) U.S. Cl.
CPC ........... *G06V 20/588* (2022.01); *B60Q 1/247* (2022.05); *B60Q 1/249* (2022.05); *B60Q 9/00* (2013.01); *G06V 10/141* (2022.01); *H04N 23/20* (2023.01); *H04N 23/56* (2023.01); *H04N 23/74* (2023.01); *B60Q 2400/50* (2013.01); *F21W 2103/60* (2018.01); *F21W 2105/00* (2018.01); *G06T 2207/30252* (2013.01)

(58) Field of Classification Search
CPC ....... G06V 20/588; B60Q 1/247; B60Q 1/249
See application file for complete search history.

(56) References Cited

U.S. PATENT DOCUMENTS

| | | | |
|---|---|---|---|
| 8,922,388 B2 * | 12/2014 | Nykerk | B60Q 1/0023 340/901 |
| 9,304,081 B2 * | 4/2016 | Rennó | G01N 21/55 |

(Continued)

FOREIGN PATENT DOCUMENTS

| | | | | |
|---|---|---|---|---|
| JP | 2013079937 A | * | 5/2013 | .............. B60T 8/172 |
| JP | 2020-177854 A | | 10/2020 | |
| WO | WO-2018235192 A1 | * | 12/2018 | ........... B60Q 1/0483 |

OTHER PUBLICATIONS

JP-2013079937-A, English Translation (Year: 2013).*
WO-2018235192-A1, English Translation (Year: 2018).*

*Primary Examiner* — Ryan D Walsh
(74) *Attorney, Agent, or Firm* — TROUTMAN PEPPER HAMILTON SANDERS LLP

(57) ABSTRACT

A road surface state detection apparatus includes a light emitter, an optical sensor, and an electronic control unit. The light emitter is configured to project an image with visible light on a road surface below a side of a vehicle. The optical sensor is provided on the side of the vehicle and configured to receive reflected light from the projected image. The electronic control unit is configured to determine a state of the road surface based on the reflected light received by the optical sensor.

10 Claims, 4 Drawing Sheets

(56) References Cited

U.S. PATENT DOCUMENTS

| | | | |
|---|---|---|---|
| 10,013,617 B2* | 7/2018 | Zhao | B60Q 9/00 |
| 2008/0129541 A1* | 6/2008 | Lu | G06V 20/56 |
| | | | 340/905 |
| 2013/0027511 A1* | 1/2013 | Takemura | G06V 20/588 |
| | | | 348/42 |
| 2016/0280126 A1* | 9/2016 | Tanaka | B60R 25/01 |
| 2017/0096144 A1* | 4/2017 | Elie | H04N 5/33 |
| 2017/0237945 A1* | 8/2017 | Murar | B60K 35/00 |
| | | | 348/148 |
| 2018/0319337 A1* | 11/2018 | Nagai | G01S 17/42 |
| 2019/0078877 A1* | 3/2019 | Suzuki | B60Q 9/00 |
| 2019/0210518 A1* | 7/2019 | Michalakis | G06V 20/56 |
| 2020/0099843 A1* | 3/2020 | Kanayama | H04N 5/33 |
| 2020/0231085 A1* | 7/2020 | Kunii | B60Q 1/54 |
| 2021/0012123 A1* | 1/2021 | Kim | G06V 10/141 |
| 2023/0078087 A1* | 3/2023 | Sato | G01N 21/359 |
| | | | 250/338.1 |

* cited by examiner

ROAD SURFACE STATE DETECTION APPARATUS AND ROAD SURFACE STATE NOTIFICATION APPARATUS

CROSS-REFERENCE TO RELATED APPLICATION

The present application claims priority from Japanese Patent Application No. 2021-136316 filed on Aug. 24, 2021, the entire contents of which are hereby incorporated by reference.

FIELD OF THE INVENTION

The disclosure relates to a road surface state detection apparatus that detects a road surface state on a side of a vehicle and a road surface state notification apparatus that notifies of a road surface state on a side of a vehicle.

BACKGROUND

A road surface state, such as wetting, freezing, and irregularities of a road surface, influences running of a vehicle. Japanese Unexamined Patent Application Publication (JP-A) No. 2020-177854 describes a system that irradiates a road surface ahead of a vehicle with measuring light for forming an orientation pattern for detecting a road surface state, in addition to illuminating light, to detect the road surface state based on the measuring light received by an imaging apparatus.

SUMMARY

An aspect of the disclosure provides a road surface state detection apparatus including a light emitter, an optical sensor, and an electronic control unit. The light emitter is configured to project an image with visible light on a road surface below a side of a vehicle. The optical sensor is provided on the side of the vehicle and configured to receive reflected light from the projected image. The electronic control unit is configured to determine a state of the road surface based on the reflected light received by the optical sensor.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

Although the system described in JP-A No. 2020-177854 detects the road surface state ahead of a vehicle, the system does not detect the road surface state on sides of the vehicle. However, if the road surface on a side of the vehicle is wet or frozen, it is desirable for a person to be careful because the person is likely to slip when he/she gets off the vehicle. The detection of the road surface states on the sides of the vehicle enables the states of the road surfaces that are contact with the tires of the vehicle to be roughly determined. Accordingly, it is considered that the sides of the vehicle are irradiated with light to detect the road surface states using a light receiving element, such as an imaging apparatus. However, the irradiation on the sides of the vehicle with light may give a feeling of strangeness to a driver or persons around the vehicle. The feeling of strangeness may be given to the driver or persons around the vehicle regardless of whether the vehicle is running or is stopped.

In order to resolve the above problem, it is desirable to provide a road surface state detection apparatus that projects an image with visible light on the road surface on a side below a vehicle and receives reflected light from the projected image to detect the road surface state.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
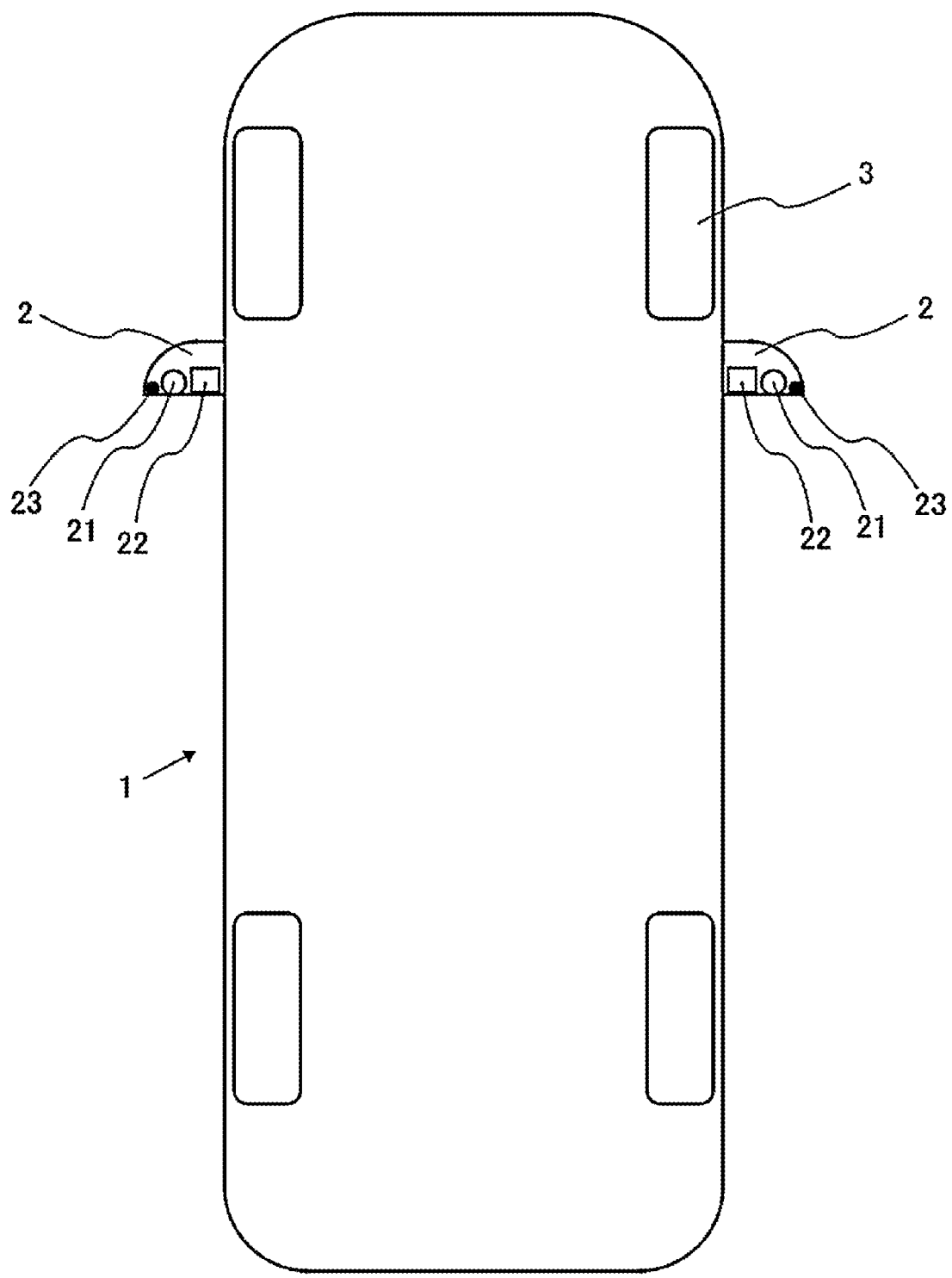
FIG. 1 is a diagram when a vehicle of an embodiment is viewed from the bottom.
Figure 2:
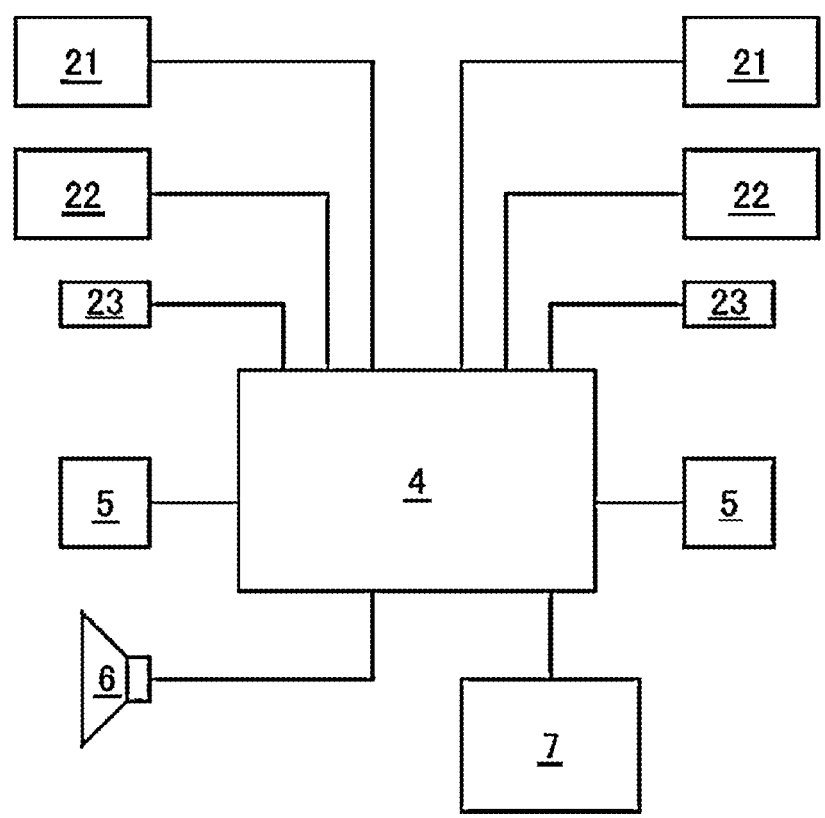
FIG. 2 is a diagram illustrating a system configuration in the embodiment.

A vehicle 1 in a first embodiment is provided with a compact projector 21, a camera 22, which is an optical sensor, and an infrared light emitting diode (LED) 23 on the bottom of each of left and right door mirrors 2 when the vehicle 1 is viewed from the bottom, as illustrated in FIG. 1. As illustrated in FIG. 2, the projectors 21, the cameras 22, and the infrared LEDs 23 on the left and right sides are connected with an electronic control unit (ECU) 4. A door knob sensor 5 of each front door, a speaker 6, and another ECU 7 are also connected with the ECU 4.

Figure 3:
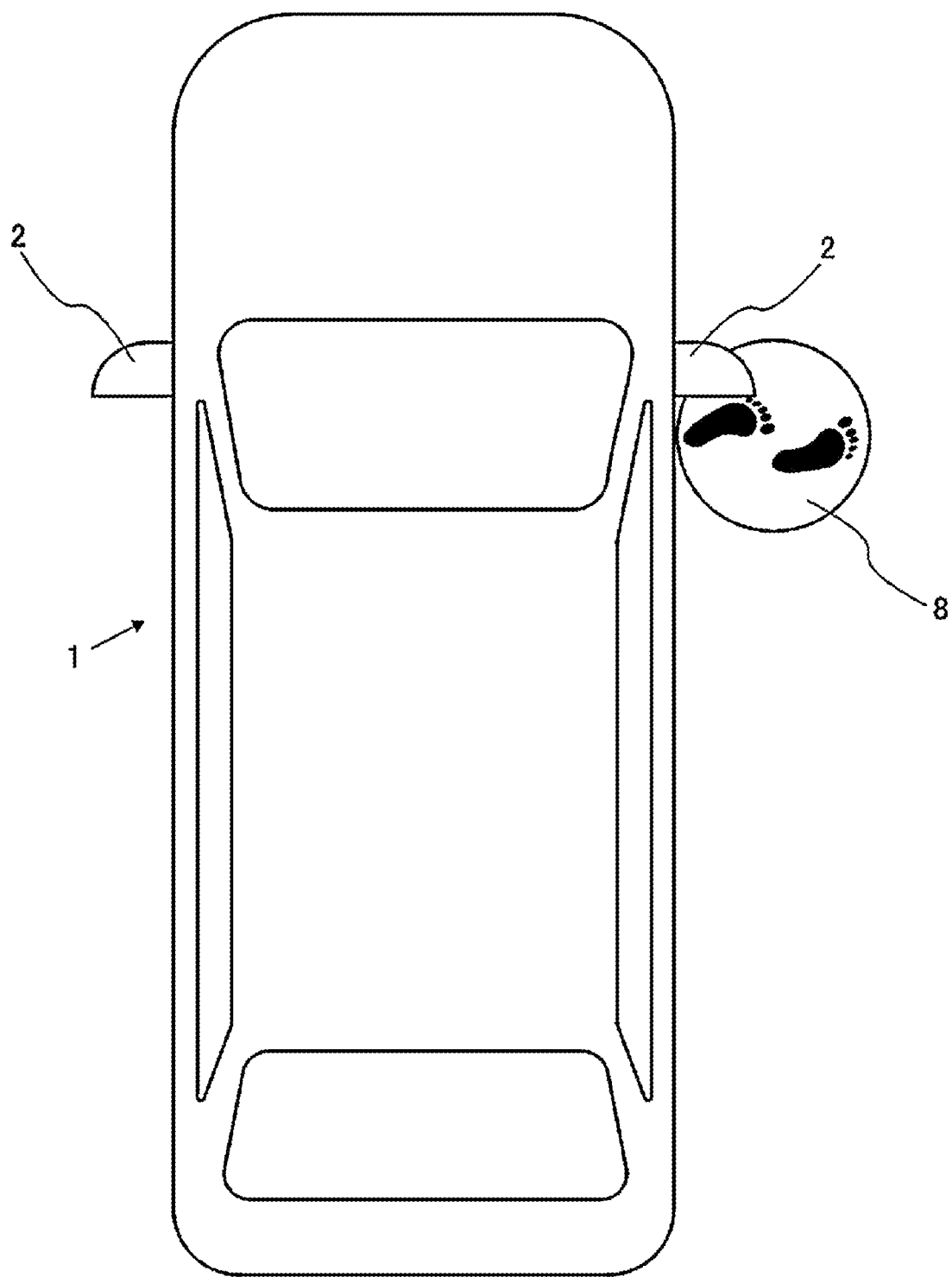
FIG. 3 is a diagram when the vehicle that projects an image is viewed from the top in the embodiment.

In response to touch of the door knob sensor 5 in the vehicle 1 when the vehicle 1 is stopped, an image 8 having a foot pattern is projected with visible light on the road surface on the corresponding side below the vehicle 1 from the projector 21 at the side on which the door knob sensor 5 is touched under the control of the ECU 4. This indicates to persons outside the vehicle 1 that an occupant will get off from the vehicle 1 and does not give a feeling of strangeness to the persons outside the vehicle 1. FIG. 3 illustrates a status in which the front-seat driver at the right side touches the door knob with his/her finger to get off the vehicle 1. Upon touch of the door knob with his/her finger by the front-seat occupant at the left side, the projector 21 on the left side operates and the image 8 is projected on the road surface below the left-side door mirror 2.

The reflected light from the projected image 8 is received by the camera 22 for shooting. A video that is shot is supplied to the ECU 4 to be used for determination of the road surface state. This causes the system of the vehicle 1 to serve as a road surface state detection apparatus in an embodiment of the disclosure. If the ECU 4 determines that the road surface is wet, an audio signal is transmitted from the ECU 4 to the speaker 6 to make an announcement "Please be careful not to slip because the road surface is wet" in the vehicle 1. If the ECU 4 determines that a puddle is left, an audio announcement "Please be careful of a puddle" is made in the vehicle 1. If the ECU 4 determines that the road surface is frozen, an audio announcement "Please be careful not to slip because the road surface is frozen" is made in the vehicle 1. This causes the system of the vehicle 1 to serve as a road surface state notification apparatus to alert the occupant when he/she gets off the vehicle 1 in an embodiment of the disclosure.

Infrared light, which is invisible light, is radiated during running in the first embodiment. In the radiation of the infrared light, which is invisible light, the image is not used. The ECU 4 is connected with the other ECU 7. Upon transmission of a running signal indicating that the vehicle 1 is running from the other ECU 7, the ECU 4 stops the radiation of the visible light by the projector 21. Then, the infrared light is radiated from the two infrared LEDs 23 to the road surfaces below the door mirrors 2. The reflected light of the radiated infrared light is received by the cameras 22 for spotting and a video that is shot is supplied to the ECU 4. The ECU 4 determines the road surface state from the video. The determination result indicating that the road surface is wet or the determination result indicating that the road surface is frozen is transmitted from the ECU 4 to the other ECU 7. Since the road surface that is in contact with each tire 3 is close to the road surface below the corresponding door mirror 2, the other ECU 7 is capable of estimating the road surface state that is in contact with the tire 3 from the road surface state indicated in the determination result. This causes the system of the vehicle 1 to function as a road surface state notification apparatus to alert the driver to a slip in an embodiment of the disclosure. In addition, it is possible to vary control of four-wheel driving based on the estimated road surface state.

If the ECU 4 determines that there is a level difference, such as a curbstone, near the bottom of the door mirror 2 while the vehicle 1 is running forward, a warning is given from the speaker 6 if the driver turns the steering wheel toward the level difference. This prevents the rear wheel from going onto the curbstone or the like. If the driver turns the steering wheel while the vehicle 1 is running backward and the ECU 4 determines that there is a level difference, the sound emitted from the speaker 6 is varied based on the closeness to the level difference. This prevents the front wheel from being scratched on the curbstone when the driver drives the vehicle 1 backward to pull over to the side of the road for parking.

Figure 4:
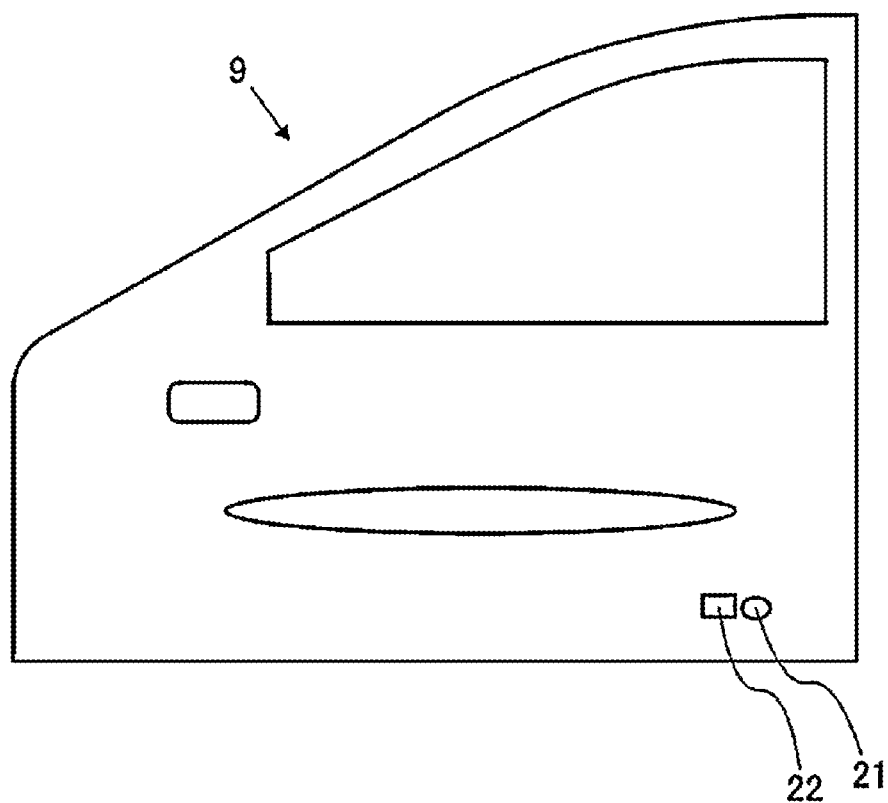
FIG. 4 is a diagram when a door of a vehicle of an embodiment is viewed from the inside.

In a second embodiment, the projector 21 and the camera 22 are provided inside a door 9. As illustrated in FIG. 4, the projector 21 and the camera 22 are mounted to lower back portions of the inside of the front-seat door 9 obliquely downward. The vehicle 1 in the second embodiment has the system configuration illustrated in FIG. 2, as in the first embodiment.

In the second embodiment, when the door 9 is opened, the image 8 is projected with visible light on the road surface on the side below the vehicle 1 from the projector 21 on the door 9 that is opened under the control of the ECU 4. The projected image 8 has functions of foot illumination and display design. The reflected light from the projected image 8 is received by the camera 22 for shooting. A video that is shot is supplied to the ECU 4 to determine the road surface state and an announcement of the road surface state is made, as in the first embodiment. The radiation of the infrared light or the like is not performed while the vehicle 1 is running in the second embodiment.

Although the embodiments of the disclosure are described above in detail with reference to the drawings, specific configurations are not limited to the embodiments and modifications or the likes of the design within the scope of the disclosure are included in the disclosure. Combinations of the techniques in the respective embodiments are available unless the objectives, the configurations, and so on are inconsistent or have any problem.

For example, although crawl is included in running and the detection is switched to the detection of the infrared light, which is invisible light, during crawl in the first embodiment, the visible light may be radiated during crawl. In addition, although the light emitting apparatus and the camera are provided on the bottom of each door mirror or on lower portions of the inside of each door, the light emitting apparatus and the camera may be appropriately provided on each side of the vehicle.

The image may be a pattern or a character suggesting getting-off or the like or may be a mark indicating the brand of the vehicle 1. Alternatively, the image may be another design pattern or design image. In addition, another optical sensor may be used, instead of the camera, to determine the road surface state based on the amount of received light or the like.

According to the embodiments of the disclosure, the detection of the road surface state by receiving the visible-light mark that is projected enables the road surface state to be detected through the projection that is less likely to give a feeling of strangeness to the driver and/or persons around the vehicle even if the image is projected on the sides of the vehicle. In addition, it is possible to provide a sense of luxury or the like through the projection of the mark, in addition to the detection of the road surface state.

The ECU 4 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the ECU 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A road surface state detection apparatus comprising:
   a light emitter;
   an optical sensor provided on a side of a vehicle; and
   an electronic control unit configured to determine a state of a road surface, wherein while the vehicle is stopped,
      the light emitter is configured to project an image with visible light on the road surface below the side of the vehicle,
      the optical sensor configured to receive reflected light from the projected image, and the electronic control unit is configured to determine the state of the road surface based on the reflected light, from the projected image, received by the optical sensor, and while the vehicle is running,
the light emitter is configured to project invisible light in lieu of the visible light, and
the optical sensor is configured to receive reflected light of the invisible light projected on the road surface, and
the electronic control unit is configured to determine the state of the road surface based on an amount of the reflected light, of the invisible light, received by the optical sensor.

2. The road surface state detection apparatus according to claim 1,
wherein the optical sensor is a camera provided on the side of the vehicle.

3. A road surface state notification apparatus comprising:
the road surface state detection apparatus according to claim 2; and
a notifier configured to, in a case where the light emitter projects the image with the visible light while the vehicle is stopped, and the reflected light of the received visible light indicates that the road surface is wet, alert an occupant in the vehicle of the wet road surface.

4. A road surface state notification apparatus comprising:
the road surface state detection apparatus according to claim 2; and
a notifier configured to, in a case where reflected light of invisible light that is received while the vehicle is running indicates that the road surface is wet, alert a driver to a slip, wherein
while the vehicle is running, the light emitter projects the invisible light in lieu of the visible light, and the optical sensor receives the reflected light of the invisible light projected on the road surface.

5. The road surface state detection apparatus according to claim 2,
in response to sensing an occupant touching a doorknob inside the vehicle to get off the vehicle while the vehicle is stopped, the light emitter configured to project the image with visible light on the road surface below a corresponding side of the vehicle.

6. The road surface state detection apparatus according to claim 2, wherein the light emitter and the optical sensor are located within a door of the vehicle.

7. A road surface state notification apparatus comprising:
the road surface state detection apparatus according to claim 1; and
a notifier configured to, in a case where the light emitter projects the image with the visible light while the vehicle is stopped, and the reflected light of the received visible light indicates that the road surface is wet, alert an occupant in the vehicle of the wet road surface.

8. A road surface state notification apparatus comprising:
the road surface state detection apparatus according to claim 1; and
a notifier configured to, in a case where reflected light of invisible light that is received while the vehicle is running indicates that the road surface is wet, alert a driver to a slip, wherein
while the vehicle is running, the light emitter projects the invisible light in lieu of the visible light, and the optical sensor receives the reflected light of the invisible light projected on the road surface.

9. The road surface state detection apparatus according to claim 1,
in response to sensing an occupant touching a doorknob inside the vehicle to get off the vehicle while the vehicle is stopped, the light emitter configured to project the image with visible light on the road surface below a corresponding side of the vehicle.

10. The road surface state detection apparatus according to claim 1, wherein the light emitter and the optical sensor are located within a door of the vehicle.

* * * * *